April 30, 1963   P. BORTOLINI ETAL   3,087,867
DISTILLATION PROCESS FOR MIXTURES OF PYRIDINES
Filed Aug. 11, 1959
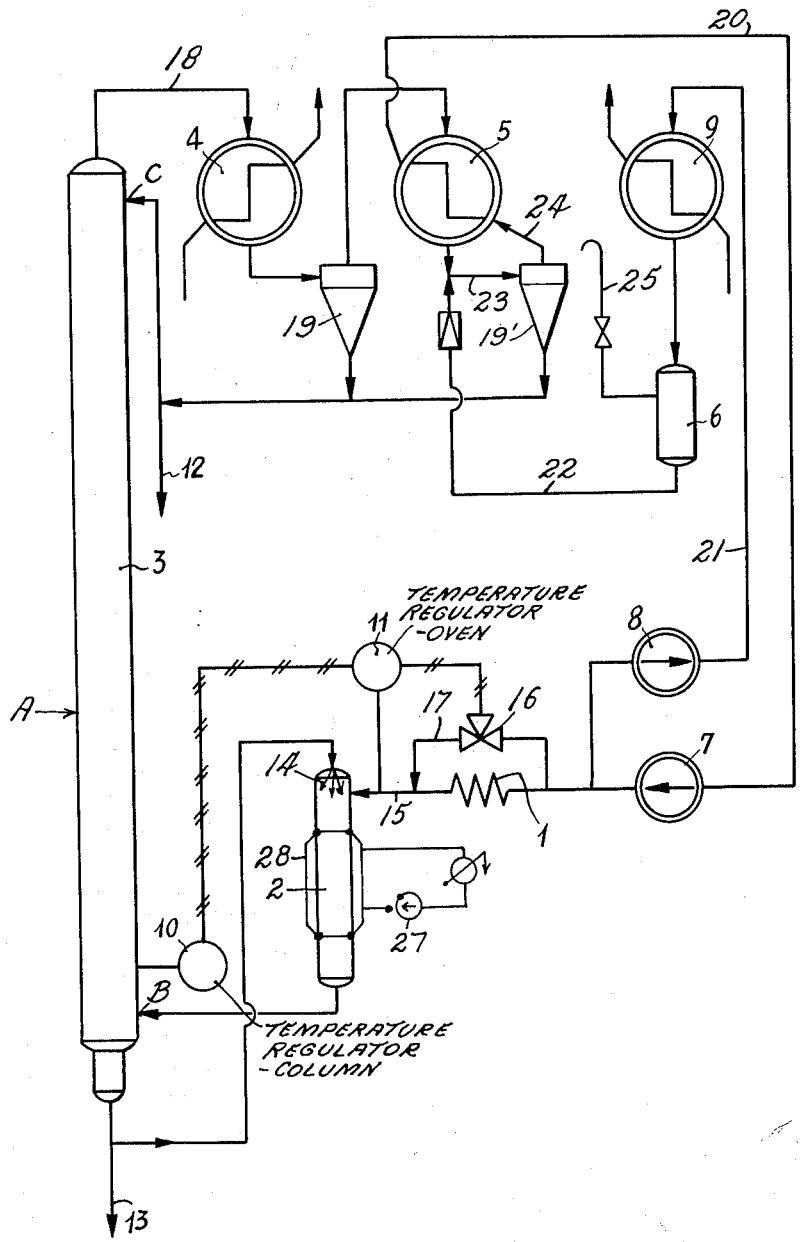
INVENTORS:
Paolo Bortolini
Giorgio Guerrieri
BY
Patent Agent ３,087,867
Patented Apr. 30, 1963

3,087,867
DISTILLATION PROCESS FOR MIXTURES OF
PYRIDINES
Paolo Bortolini and Giorgio Guerrieri, Milan, Italy, assignors to Sicedison S.p.A., Milan, Italy
Filed Aug. 11, 1959, Ser. No. 832,987
Claims priority, application Italy Nov. 27, 1958
5 Claims. (Cl. 202—48)

This invention relates to a process for the fractional distillation of a mixture of compounds having high boiling points, a relative volatility close to unity, and low thermal stability and a tendency toward the formation of polymers.

In particular, this invention relates to a process for the separation of methyl-ethyl-pyridine (hereinafter called MEP) from methyl-vinyl-pyridine (hereinafter called MVP) which process, as hereinafter described, facilitates the economical and thorough separation of the compounds under temperature conditions which are sufficiently low to almost completely avoid the polymerization of the MVP.

As already known, MVP which is primarily utilized as an intermediate product in the making of acrylonitrile textile fibres may be obtained by the dehydrogenation of MEP. The raw dehydrogenated product may consist, for example, of the mixture of MVP in an amount ranging from 25% to 50% and MEP, together with low boiling compounds, water and small fractions of high boiling compounds.

While no special difficulties are encountered in the removal of the low boiling compounds and water, the separation of the MEP from MVP is difficult to accomplish, for the reason that both MEP and MVP show a relative volatility very close to 1, this being the difference in boiling points under atmospheric pressure of about 1° C.

Further the boiling points are relatively high, that of MEP being 178° C. and that of MVP being 179° C. In addition the MVP is highly subject to polymerization reactions for which reason it is desirable that the temperature of the distillation column be kept as low as practicable, that the time of residence of the MVP in the heated portion of the distillation column be kept as small as possible, and further resort being made to the presence of polymerization inhibitors in the process.

In view of these considerations it is desirable that the fractionation of the mixture be carried out in a stream of entraining gas or vapor whereby the aforesaid low temperature requirements may be met, and also in view of the fact that a column equipped with a large number of trays must be used.

Hitherto in distillation procedures wherein the aforesaid difficulties are encountered, steam has been usually employed as the entraining vapor, the operation being referred to as steam distillation.

It is an object of the present invention to provide a process for separating the aforesaid high boiling compounds which have a relative volatility close to unity, and showing a high susceptibility to polymer formations, such as MEP and MVP mixtures, wherein there is used as the distillation medium a gas containing at least one component that remains extraneous to the fractional distillation and will not condense at the normal working conditions of the process.

According to the present invention, it is found that very good separations may be obtained using a noncondensing gas such as ammonia, methane, air or hydrogen, while operating at low temperatures. The use of ammonia gas is found to be highly suitable in realizing the objects of the invention.

Whereas the essentials of the process according to the present invention are pointed out in the subjoined claims, in order that the invention may be fully understood reference is now made to a specific embodiment whereby the invention may be carried into practice. Referring to the drawing; the gas, for instance ammonia, after having been preheated up to 200° C. in an oven 1, flows into a vaporizer 2, wherein its sensible heat is released, and in the case of separation of MEP from MVP, a saturation with MVP takes place. Thus the gas saturated with MVP and heated to a temperature of 100° C. is introduced at the base of the distillation column 3. The organic vapors present in the gas stream, rising upward in the column, are more and more enriched with MEP, contained in the mixture of MEP and MVP introduced in said column 3 at inlet A, and the gas saturated with nearly pure MEP is taken off from the column head. Thence the vapors are passed through one or more condensers 4 and 5 where same are cooled until a temperature of 5° C. is reached. A certain fraction of the condensed MEP is recycled in the column as the reflux, while the balance is taken as distillate from point 12. The gas owing to its noncondensability, may be readily purified from all organic vapors, whereupon it is fed back to the centrifugal compressor 7 and then is recycled into the oven 1. Liquid MVP is collected from the bottoms at the point 13 at the base of the column.

In carrying the process according to the invention into practice, it has been ascertained that it is to better advantage if the vaporizer 2 consists of a vertical, narrow, cylindrical chamber, wherein the base MVP is sprayed into the superheated gas by means of spray nozzles. It follows that, however hot the gas may be, the liquid droplets can never be heated to a temperature higher than the saturation end temperature, thereby preventing objectionable overheating. The amount of liquid MVP sprayed into the vaporizer, is desirably in excess of that required for the saturation of the gas; such excess is useful both to readily attain a complete saturation of the gas, and to prevent deposit of high boiling compounds in the vaporizer.

The side walls of the cylindrical chamber are moistened by the excess of liquid MVP which has not been vaporized. To prevent the possible overheating of the walls by the gas, and the possibility in the case of MVP and MEP of any cracking or polymerization of excess liquid that comes into contact with the vaporizer walls, the vaporizer may be fitted with a cooling jacket, through which oil is circulated. The above described vaporizer makes possible a minimum time of residence of heated MVP in the base of the column.

To minimize also the input of compressor 7, pressure drops in the whole circuit, and especially in the distillation column, are essential.

The heating of the base of the column is regulated by a system comprising a temperature regulator 10, by means of which the saturation temperature of ammonia at the base of the column is held constant through the action of a further regulator 11 on an offtake connected in parallel with the heater 1, and thus serving to control the temperature of the overheated ammonia at the vaporizer inlet. By this means there is prevented any overheating of the column walls, even in event that the feed of MVP to the spray nozzles of the vaporizer is discontinued, due to a mistake by the operator, or to a malfunction of the apparatus.

According to the invention, not only ammonia but also methane, air or hydrogen may be used as the extraneous noncondensing gas chemically nonreactive with the compounds to be separated in the sense that such gases remain in a noncondensed condition under the normal working conditions of the plant.

For the obtaining of high purity (98–99%) MVP, the end condensation temperature of the gas at the column inlet must be kept low. When ammonia is used as the circulating gas, it is found particularly convenient to draw a small portion, for instance about 3% of the whole amount, of the ammonia which is being circulated, as shown in the drawing, and then compressing by a compressor 8 said portion up to the pressure of about 8 to 10 atmospheres, condensing same in the condenser 9 and spraying into the ammonia that is being circulated, whereby the required low temperature may be attained without the intervention of a heat exchanger. In order to minimize the portion of ammonia which is compressed up to 10 atmospheres, it is found convenient to install a condenser exchanger 5 following the water condenser 4 whereby the cooling capacity of the gas can be recovered before it is returned to the centrifugal compressors 7. All of the extraneous gases are collected in the cooling circuit after the condensation of the ammonia and are withdrawn from the condenser 9. A collection barrel 6 for ammonia may be provided if desired.

To further illustrate the advantages of the present invention there follows a comparison between a few of the features of a distillation plant for the mixture MEP—MVP operated with a flow of noncondensable gas according to the invention, and the comparable features of a conventional steam distillation plant.

When the steam distillation is made at about 100° C. approximately 13 moles of steam are needed for each mole of organic vapor rising in the column. Taking into account that in the distillation of MEP—MVP, very high reflux rates (e.g. $R=8$) are needed, it follows that in the case of a feed consisting of 40% MVP and 60% MEP the steam consumption will amount to about 30 kilograms per kilogram of MEP obtained, with a heat consumption of about 20,000 calories per kilogram of MEP.

When, on the other hand, the distillation is carried out in a stream of noncondensable gas, the heat requirements are cut down to the amounts strictly needed for the heating of the gas, and for the vaporization of the organic mixture. In fact when the operation is performed under the aforesaid conditions of temperature, dilution, reflux and concentration for the distillation in a gas stream; only 1600 calories per kilogram of MEP will be found sufficient.

The aforesaid conservation of heat consumption holds good also for the cooling water consumption; in other words, when working with a noncondensable gas stream, the cooling water consumption will be cut down to $\frac{1}{10}$ of the amount required with the steam distillation.

Since the water can be taken up by the MEP and MVP in amounts up to 20%, both the head and tail products of a steam distillation must be rerun for the removal of the water therein present. Moreover the organic mixture is readily dissolved in water, whereby it must be recovered from the head aqueous layer.

The above problems do not exist when the distillation is carried out in a stream of noncondensable gas with a MEP purifying equipment suitable for the distillation process according to this invention, whereby the whole plant may be very considerably less expensive and may be carried out with overall smaller size equipment. Moreover a decrease in the cost of supervision and upkeep also is attained.

Whereas in the steam distillation it is practically impossible to prevent a partial condensation of the steam on the inside of the column, a similar drawback cannot exist, as now will be understood, when the distillation is carried out in a stream of noncondensable gases. Owing to the said condensation of steam, the use of condensate separators is required, whereby the starting of a plant constitutes a laborious undertaking, and the efficiency of the trays is also decreased.

Moreover if the steam distillation is to be practically carried out, a molar ratio of steam to organic substance of about 13, is required while the distillation in a noncondensable gas stream can be performed with any dilution ratio. Inasmuch as the ratio may be increased at will, the possibility arises whereby the gas may be heated to a lower temperature at the inlet to the vaporizer, thus reducing the danger of cracking and polymerization reactions.

In using ammonia as the noncondensable gas the following advantages are obtained:

The very low density of the gas permits under conditions of equality of flow rate, a decrease in the internal diameter of the distillation column, pipings and the like, as well as to cut down on the load losses throughout the circuit, which results in savings in the first costs and operating costs. The high specific heat of the gas permits the employment of a relatively low gas temperature at the inlet to the vaporizer. The use of ammonia as the noncondensable gas further opens the possibility of adopting the equipment described and diagrammatically shown in the accompanying drawing, for the cooling and removal of the extraneous gases. In addition, ammonia is altogether inert with respect to the organic compounds which are processed, shows a good thermal stability, and improves the relative volatility of the mixture of components.

It will be understood that the foregoing description is to be interpreted as illustrative of the invention and not in a limiting sense.

What is claimed is:

1. A process for the fractional distillation of a liquid mixture containing constituents having a high boiling point, a relative volatility close to unity, and low thermal stability, and consisting essentially of methyl-ethyl-pyridine and methyl-vinyl-pyridine, in a stream comprising at least one gas that is noncondensible under the working conditions of the process, comprising the following steps: separately preheating said noncondensible gas, passing a stream of said preheated gas through a vaporizer zone and thence into a distillation zone, introducing into said gas in said distillation zone a mixture of methyl-ethyl-pyridine and methyl-vinyl-pyridine, and therein subjecting said methyl-ethyl-pyridine and methyl-vinyl-pyridine to fractional distillation, separating from said distillation an overhead product rich in methyl-ethyl-pyridine and a bottoms product rich in methyl-vinyl-pyridine, introducing a portion of said bottoms product into said stream of gas in said vaporizer zone, vaporizing said portion therein and reintroducing said vaporized portion into said distillation zone.

2. A process according to claim 1 wherein said noncondensible gas is selected from the group consisting of ammonia, methane, hydrogen and air.

3. A process according to claim 1 wherein said portion of said bottoms product is introduced into said vaporizer zone in the form of a spray.

4. A process according to claim 1 wherein said bottoms product consists essentially of methyl-vinyl-pyridine, and is introduced into said stream of gas in said vaporizer zone in excess of the absorbing capacity of said gas, whereby deposition of residues in the vaporizer in substantially prevented, the walls of said vaporizer being held at a constant temperature close to the saturation temperature.

5. A process for the fractional distillation of a liquid mixture containing constituents having a high boiling point, a relative volatility close to unity, and low thermal stability, and consisting essentially of methyl-ethyl-pyridine and methyl-vinyl-pyridine, said process comprising: separately preheating said noncondensible gas, passing a stream of said preheated gas through a vaporizer zone and thence into the lower part of a distillation zone, maintaining said lower part of said distillation zone at a substantially constant temperature, introducing into said gas in said distillation zone a mixture of methyl-ethyl-pyridine and methyl-vinyl-pyridine, and therein subjecting said methyl-ethyl-pyridine and methyl-vinyl-pyridine to fractional distillation, separating from said distillation an overhead product rich in methyl-ethyl-pyridine and a bottoms product rich in methyl-vinyl-pyridine, introducing a portion of said bottoms product into said stream of gas in said vaporizer zone, vaporizing said portion therein and reintroducing said portion into said distillation zone.

References Cited in the file of this patent

UNITED STATES PATENTS

| | | |
|---|---|---|
| 1,546,345 | Laird | July 14, 1925 |
| 2,095,578 | Theiler | Oct. 12, 1937 |
| 2,161,798 | Carter | June 13, 1939 |
| 2,368,904 | Tuerck et al. | Feb. 6, 1945 |
| 2,452,797 | Smith | Nov. 2, 1948 |
| 2,616,838 | Williams | Nov. 4, 1952 |
| 2,767,133 | Shobe | Oct. 16, 1956 |
| 2,769,773 | Burns | Nov. 6, 1956 |
| 2,782,148 | Geiger | Feb. 19, 1957 |
| 2,799,677 | Findlay | July 16, 1957 |